UNITED STATES PATENT OFFICE.

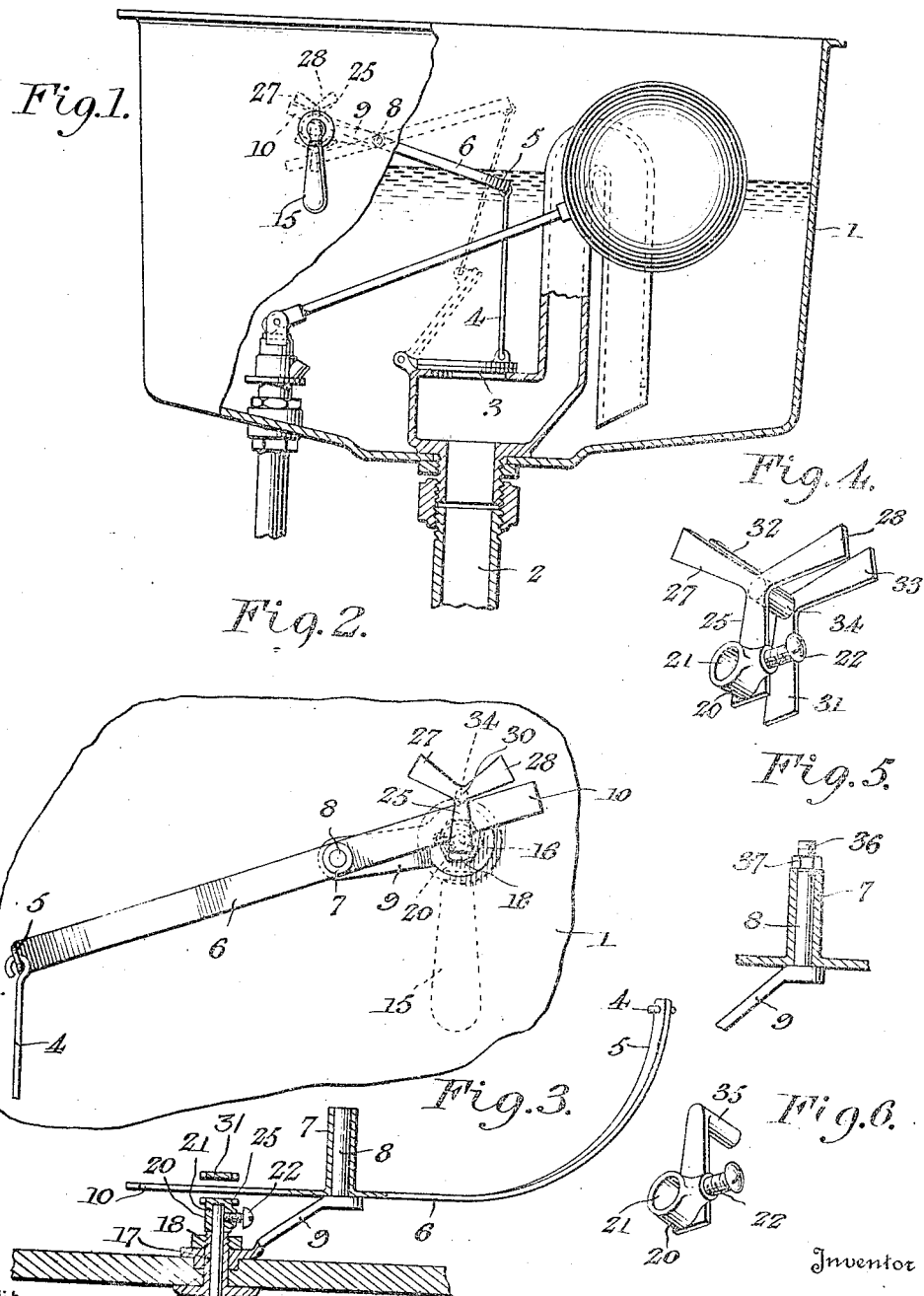

WILLIAM U. GRIFFITHS, OF PHILADELPHIA, PENNSYLVANIA.

VALVE-ACTUATING MEANS FOR WATER-CLOSET APPARATUS.

1,318,864. Specification of Letters Patent. Patented Oct. 14, 1919.

Application filed April 9, 1917. Serial No. 160,733.

*To all whom it may concern:*

Be it known that I, WILLIAM U. GRIFFITHS, a citizen of the United States, and a resident of Philadelphia, in the county of Philadelphia and State of Pennsylvania, have invented certain new and useful Improvements in Valve-Actuating Means for Water-Closet Apparatus, of which the following is a specification.

My invention has for one of its objects to provide a construction of means for actuating the valves of water-closet apparatus which is simple in construction and positive in its action.

A further object is to provide a construction comprising relatively few parts which parts are so supported and so connected together as to be unlikely to become displaced and thereby require repair.

Other objects and advantages of my invention will be referred to in the detailed description thereof which follows or will be apparent from such description.

In order that my invention may be more easily understood reference should be had to the accompanying drawings in which I have illustrated two slightly different forms of embodiment thereof.

In the said drawings:—

Figure 1 is a view showing a flush tank partly in section and partly in elevation and provided with valve actuating means shown in elevation embodying my invention;

Fig. 2 is a view from the inside of the tank showing said valve actuating means in rear side elevation;

Fig. 3 is a horizontal sectional view through a portion of one side of the tank and through the said valve actuating means;

Fig. 4 is a perspective view showing a portion of the said actuating means;

Fig. 5 is a transverse sectional view of a portion of the said actuating means showing a modification of the construction; and Fig. 6 is a perspective view of a portion of the said valve actuating means adapted to be used instead of the corresponding portion shown in Fig. 4.

In the drawings, 1 designates the flush tank of a water-closet apparatus provided with an outlet port 2 closed by means of a valve 3. The said valve is connected by means of a link 4 to the inner end 5 of a lever 6 provided with a relatively long hollow projection 7 which is fitted upon a projection 8 extending inwardly from the inner end of an inwardly extending bracket 9 supported upon the inner side of a wall of the tank 1. The lever 6 extends beyond, that is, to the left of the projection 7, as shown at 10.

15 designates an operating handle situated, as usual, upon the outside of the tank 1 and connected at one end of a short revoluble shaft 16 supported in a bearing sleeve 17 extending through a hole in the wall of the tank 1. The said sleeve also extends through an opening in one end of the bracket 9. The said bracket is secured in position and the sleeve also held in position within the opening in the wall of the tank 1 by means of a nut 18 screwed upon the inner end of the said bearing sleeve and contacting with and binding against the said bracket 9.

20 designates a boss having an opening 21 therein into which the inner end of the shaft 16 extends, as shown in Fig. 3. The said boss is secured upon the inner end of the said shaft by means of a binding screw 22.

25 designates an arm integrally or otherwise connected with the boss 20 and extending in a direction substantially at right angles to the axis of the shaft 16. Said arm is provided at its outer end with similarly shaped branch arms 27 and 28. The said arms 25, 27 and 28 radiate from the point 30. Similar arms 31, 32 and 33 are arranged in substantially parallel relation with respect to the arms 25, 27 and 28 and are supported upon the inner end of a cross connecting bar 34 integrally or otherwise connected with the said two groups of arms. Normally the operating handle 15 is in the position shown in full lines in Fig. 1 of the drawing.

In the construction shown when the handle 15 is in the position shown in full lines the arm 25 extends upwardly in a substantially vertical direction with the arms 27 and 28 extending in the directions indicated in dotted lines in Fig. 1. The arms 31, 32 and 33, being rigidly secured to the arm 25, occupy similar positions as will be apparent from an inspection of Fig. 4.

When in such position the end portion 10 of lever 6 is situated in the space between the arms 25 and 31, as is clearly indicated in Figs. 2 and 3. As a result of such arrangement it is apparent that movement of the operating handle 15 in either direction causes movement of the cross rod or bar 34 in the opposite direction and movement of the latter, because of its contact with the upper edge of the end portion 10 of the lever, causes a downward movement of the latter and a consequent upward movement of the opposite end portion 5 of said lever which is connected with the link 4. As a result of such upward movement of the end portion 5 the valve 3 is opened, as indicated in dotted lines in Fig. 1.

It will be observed that the pivot projection 8 is not provided with any means for retaining the lever 6 thereon. The arms 25, 27 and 28, 31, 32 and 33 operate to retain the lever in position upon the said pivot. The angular relation of the arms of each group with respect to each other is such that no matter to what position or positions the arms may be moved the end portion 10 of the lever is at all times between one or more couples of said arms. It will be understood that the shaft 16 is completely revoluble.

In Figs. 1 to 4 inclusive I have shown a preferred form of embodiment of my invention and in Figs. 5 and 6 I have shown a modification of construction in which the arms 27, 28, 31, 32 and 33 have been omitted. The arm 25, however, is retained and is adapted to be secured to the inner end of a shaft 16 by means of a hollow boss 20 and a binding screw 22 in the same manner as described in connection with the construction shown in Figs. 1 to 4. The arm 25 is provided at its outer end with an inwardly extending projection or lug 35 which contacts with the upper edge of the end portion 10 of the lever 6 to actuate the said lever about its pivot in the manner already described. The lever 6 in the constructions shown in Figs. 5 and 6 is pivotally supported upon a projection 8 extending inwardly from the bracket 9. In order to retain the lever in position upon the pivot projection 8 the latter is screw threaded as at 36 for the reception of a nut 37 which is seated against the projecting sleeve 8 of the lever 6. Said nut operates to retain the said sleeve and lever in position upon the projection 8.

In the construction as illustrated with the lever 15 depending in a substantially vertical position as shown in full lines in Fig. 1 the arm 25 extends upwardly in a practically vertical direction, with the part 34 or 35 occupying a position over the upper edge of the end portion 10 of the lever 6 almost directly above the line of the shaft 16. It will be understood, however, that the parts may be arranged so that normally the arm 25 may extend in an inclined direction or it may occupy a substantially horizontal position with the part 34 or 35 in contact with or in proximity to the upper edge of the end portion 10 of the lever, the latter being in position as shown in Fig. 1 in full lines with the valve 3 closed.

I claim:—

1. Valve operating means for water-closet apparatus comprising in combination a pivoted lever having connection on one side of its pivot with a valve, a crank arm having a portion either in contact or adapted to contact with the opposite end portion of the said lever and means for rotating the said crank arm through a complete circle to cause pivotal movement of the said lever to open and close the said valve.

2. Valve operating means for water-closet apparatus comprising a lever having connection at one end with a valve, means for pivotally supporting said lever intermediate its ends, a crank arm coöperating with the opposite end portion of said lever for causing pivotal movement of the latter to open and close the said valve and means supported upon said crank arm on opposite sides of said lever in parallel relation to the swinging movements thereof for retaining the same upon its pivot.

3. Valve operating means for water-closet apparatus comprising in combination a lever pivoted intermediate its ends and having connection at one end with a valve, a pivot for supporting said lever, an operating handle, a shaft adapted to be operated by said handle, a crank arm having connection with the said shaft and operating upon rotation of the said shaft to cause pivotal movement of the said lever, a plurality of groups of arms carried by said crank arm, the said groups being spaced from each other and the arms of the respective groups being radially arranged and a portion of the said lever being situated in the space between the said groups of arms, substantially as described.

4. In combination, a lever, a pivot for supporting said lever, an operating handle, a rotatable shaft having connection with said handle and adapted to be rotated thereby, a crank arm having connection with said shaft, said crank arm having a lateral projection at its outer end, branch arms connected with the outer end of said crank arm and a plurality of angularly related arms connected to the end of said projection, the said last mentioned arms being situated upon the opposite side of the said lever from that of the crank arm and the arms connected with the outer end of the latter, substantially as described.

In testimony that I claim the foregoing as my invention, I have hereunto signed my name this 7th day of April, A. D. 1917.

WILLIAM U. GRIFFITHS.